United States Patent [19]

Sullivan et al.

[11] Patent Number: 5,070,413
[45] Date of Patent: Dec. 3, 1991

[54] COLOR DIGITAL HALFTONING WITH VECTOR ERROR DIFFUSION

[75] Inventors: James R. Sullivan; Rodney L. Miller; Thomas J. Wetzel, all of Rochester, N.Y.

[73] Assignee: Eastman Kodak Company, Rochester, N.Y.

[21] Appl. No.: 419,559

[22] Filed: Oct. 10, 1989

[51] Int. Cl.$^5$ .............................................. H04N 1/40
[52] U.S. Cl. ...................................... 358/456; 358/75; 358/80; 358/443
[58] Field of Search ............... 358/456, 455, 443, 447, 358/459, 75, 80, 298; 382/54

[56] References Cited

U.S. PATENT DOCUMENTS

| | | | |
|---|---|---|---|
| 4,623,973 | 11/1986 | Hoffrichter et al. | 358/80 |
| 4,654,721 | 3/1987 | Goertzel et al. | 358/459 |
| 4,667,237 | 5/1987 | Yokomizo | 358/160 |
| 4,688,995 | 5/1987 | Chen et al. | 358/459 |
| 4,876,610 | 10/1989 | Ohsawa et al. | 358/443 |
| 4,878,125 | 10/1989 | Katayama et al. | 358/443 |
| 4,884,130 | 11/1989 | Huntsman | 358/75 |

FOREIGN PATENT DOCUMENTS 63-155956  6/1988  Japan.

OTHER PUBLICATIONS

"Color & Color Mixture Scalar & Vector Fundamentals" by J. B. Cohen, vol. 13, No. 1, Feb. 1988.
"Contrast Constancy: Deblurring in Human Vison by Spatial Frequency Channels" by M. A. Georgeson et al.
"Digital Halftoning of Images" by Anastassiou and Pennington, IBM, Res. Dev., vol. 26, No. 6, Nov. 1982.

Primary Examiner—Joseph A. Orsino
Assistant Examiner—Thomas D. Lee
Attorney, Agent, or Firm—Dennis R. Arndt

[57] ABSTRACT

A halftoning method for creating a color binary image from a continuous tone color image or computer generated graphics signal is improved by diffusing color vector error and by including the visual color blur functions in the recursive error propagation algorithm so that perceived color vector rather than binary color error is propagated.

5 Claims, 4 Drawing Sheets

COLOR DIGITAL HALFTONING WITH VECTOR ERROR DIFFUSION

CROSS REFERENCE TO RELATED APPLICATION

Reference is hereby made to copending U.S. patent application Ser. No. 303,205 filed Feb. 7, 1989 "Digital Halftoning with Error Diffusion" by James R. Sullivan

TECHNICAL FIELD

The present invention relates to the field of digital image processing and more particularly to a method for digital halftoning continuous-tone color images using color-dependent error diffusion.

BACKGROUND ART

Digital halftoning is a technique employing digital image processing to produce a halftone output image from a continuous-tone input image. In the digital color image halftoning technique, a continuous-tone color image is sampled, for example with a scanner, the samples are digitized and stored in a computer. The digitized samples or pixels consist of three binary representations of red, green, and blue scanned color values typically ranging from 0 to 255 for each color. To recreate this image on a printer that is capable of printing dots of only one brightness for each output color, it is necessary to create the sensation of multi-level colors by suitably distributing the printed dots in the output image. For three color printers, e.g., those that employ cyan, magenta, and yellow toners or inks, this is a mapping at each pixel from three multi-level digital input values to one of eight, i.e., $2^3$, possible output values. Likewise for four color printers that employ black toner or ink there are sixteen or $2^4$ possible output values. Any binary combination of the three or four colors can be produced at each output pixel. One prior art method of color digital halftoning is to use clustered-dot halftone screens, one for each color, to independently threshold the input color values to produce the output binary combinations. This is typically proceeded by some sort of color processing to convert the input red, green, and blue colors into continuous-tone output cyan, magenta, yellow, and black colors for screening. There are many types of screens including adaptive screens that vary with the input signal, and many methods for introducing offsets or rotations among the screens to reduce low frequency color harmonics or Moire patterns in uniform image areas. At the high dot densities, e.g., 1800 dots/inch, of high quality graphics the fundamental screen patterns are not visible to the unaided eye. For copiers and medium-to-low quality printers, e.g., 300–500 dots/inch, however, these patterns are visible, and increasing the screen frequency to reduce their visibility reduces the number of levels and introduces false gradations or contours in the output image.

Another prior art method is to use independent error diffusion on each color. In this method, each color is processed as a separate continuous-tone signal using the techniques of error diffusion to propagate binarization error to subsequent pixels producing the perception of multiple output pixels. Although superior to screening in terms of the visibility of binary noise, this technique cannot produce optimal output color quality because it does not use the input color information interactively at each pixel, nor does it employ knowledge of the spatial response of the human visual system to color signals.

It is the object of the present invention to provide an improved color error diffusion digital halftoning technique that voids the problems noted above.

SUMMARY OF THE INVENTION

The objects of the present invention are achieved by representing the input and output colors as three dimensional vectors in a preferred color space and selecting the output color at each pixel that is closest in a p-norm distance sense to the input color vector plus a weighted sum of past color vector errors. The preferred color space can be in terms of input colors, e.g. RGB or tristimulus values XYZ, outputs colors, e.g., RGB or CMYK, or any of the linear or non-linear transformations of these colors such as CIELUV, CIELAB, YIQ, or orthogonal color spaces such as equal energy EE developed by Cohen (see "Color and Color Mixture Scalar and Vector Fundamentals" by J. B. Cohen, Vol. 13, No. 1, Feb. 1988). The only requirement is that large area solid output colors can be represented as vectors in this space. In addition, it is generally required that the system including the screener be calibratable over large areas so that input and output tristimulus values are equal. If the choice for the preferred color space is non-linear, the color calibration preprocessing which occurs prior to screening must take into account this non-linearity as well as the non-linearity of the printer. This can be done simply by constructing a look-up table that represents the inverse of the printer and human visual color transformation non-linearities. The distance metric or p-norm in the preferred color space at pixel $(i,j)$ is defined as:

$$|(\vec{v}_{i,j} + \vec{e}) - \vec{w}_{i,j}^n|^p = \quad (1)$$

$$|\vec{u}_{i,j} - \vec{w}_{i,j}^n|^p = \sum_{k=1}^{3} |v_{i,j}(k) + e(k) - w_{i,j}^n(k)|^p,$$

where $\vec{v}_{i,j}$ is the input vector, $\vec{e}$ is the color error vector comprised of a weighted sum of past error vectors, $\vec{u}_{i,j}$ is the error diffused vector, $\vec{w}_{i,j}^n$ is the $n^{th}$ output color vector, and k is the color coordinate. With eight bits of precision for each input color coordinate, there will be $2^{24}$ unique input color vectors. Depending on whether black toner is used or not there will be $2^3 = 8$, or $2^4 = 16$ output colors vectors. This is shown graphically for eight output colors in FIG. 2, where only one of the output vectors ($\vec{w}1_{i,j}$) is drawn to simplify the figure. Referring to the figure, the error diffused color vector is compared with the eight possible output color vectors $w_{i,j}^n$ to select the output that has the minimum p-norm distance. Since the output color vectors represent binary printer control signals in terms of cyan, magenta, yellow, and possibly black the chosen color is simply interpreted for printer output. The color or channel-dependent aspect of the method refers to the fact that the output color is chosen in color vector space rather than in three independent scalar spaces. One degenerate case exists when the possible output colors form a right-parallelepiped in the chosen color space with sides that are parallel to the axes of the space. In this case, the channel-dependent and channel-independent color choices will be identical. Screening in the cyan, magenta, and yellow color space of the printer which is the basis of all current dither and error diffusion techniques is degenerative and there is no difference between channel-dependent and channel-independent screening. Since the human visual system does not process cyan, magenta, and yellow information equivalently in terms of the perception of modulation, noise, or differences, as evidenced by the increased visibility of cyan-white modulation compared to yellow-white modulation, these techniques are sub-optimal.

The channel-dependent vector processing method of the present invention can be performed in a uniform visual color space, such as CIELUV or LAB space, to produce a more nearly optimum appearing result. This is illustrated schematically in FIG. 3 for halftoning in the LUV color coordinate system for a color marking engine that prints cyan (c), magenta (m) and yellow (y) dots. To practice the method, the eight possible marks that can be made by the marking engine are plotted in LUV color space. The eight marks that can be made are labeled in FIG. 3 as W for white, (i.e., no color); C for cyan; CM for cyan and magenta, and so on. The error diffused vector $\mu$ is plotted in LUV space, and the mark closest to the error diffused vector (e.g., CM) is chosen for the output value at the given pixel.

In a further refinement of the invention, the human visual blur function is incorporated into the decision process at each pixel to represent the local spatial averaging performed by the low-pass filter characteristics of vision. The perceived color vector error including blur is then propagated to subsequent pixels rather than the absolute binary color vector error. In this way, high frequency binary color errors that are not perceivable are ignored, and binary color errors at the important spatial frequencies and orientations are emphasized. This reduces the correlated noise or "worms" of conventional error diffusion. It also allows for color-dependent blur functions making it possible to better match the observed color modulation characteristics of the human visual system. At each pixel, the blur function is used to average the past choices in each color dimension with the eight possible output colors to produce eight perceived output color vectors. This averaging process moves the eight possible output color vectors inward toward the center of the output color column causing the p-norm distance metric to potentially select a different output color than it would with no blur. By including the visual blur function, the eight output color vectors will be different at each pixel. This is illustrated in FIG. 4. The major advantage of such processing is that high frequency brightness errors can be reduced by allowing high frequency chrominance errors that are not perceivable. In addition, the blur function eliminates the degenerate behavior of channel-dependent and channel-independent error diffusion in the color space of the printer, because the parallelpiped defined by the output colors is distorted at each pixel.

An additional refinement of the invention, is to curtail the diffusion of binary error or perceived error if a brightness or chrominance edge is observed in the signal. The motivation for this is that edges indicate a transition in signal type, e.g., shadow-to-highlight, sky-to-foliage, etc., and it is generally inappropriate to propagate errors across such boundaries. Standard edge detection techniques such as a Sobel filter or gradient operator are used for this purpose.

A final refinement of the invention, is to apply it to systems that can achieve more than two levels for each output color at each pixel. In either FIG. 3 or 4 this would mean more than eight possible output colors. Th p-norm metric and selection process, the blur calculation, and the color error vector propagation do not change.

BRIEF DESCRIPTION OF DRAWINGS

FIG. 5 is a schematic block diagram of the halftoning technique of the present invention without visual blur;

MODES OF CARRYING OUT THE INVENTION

Figure 1:
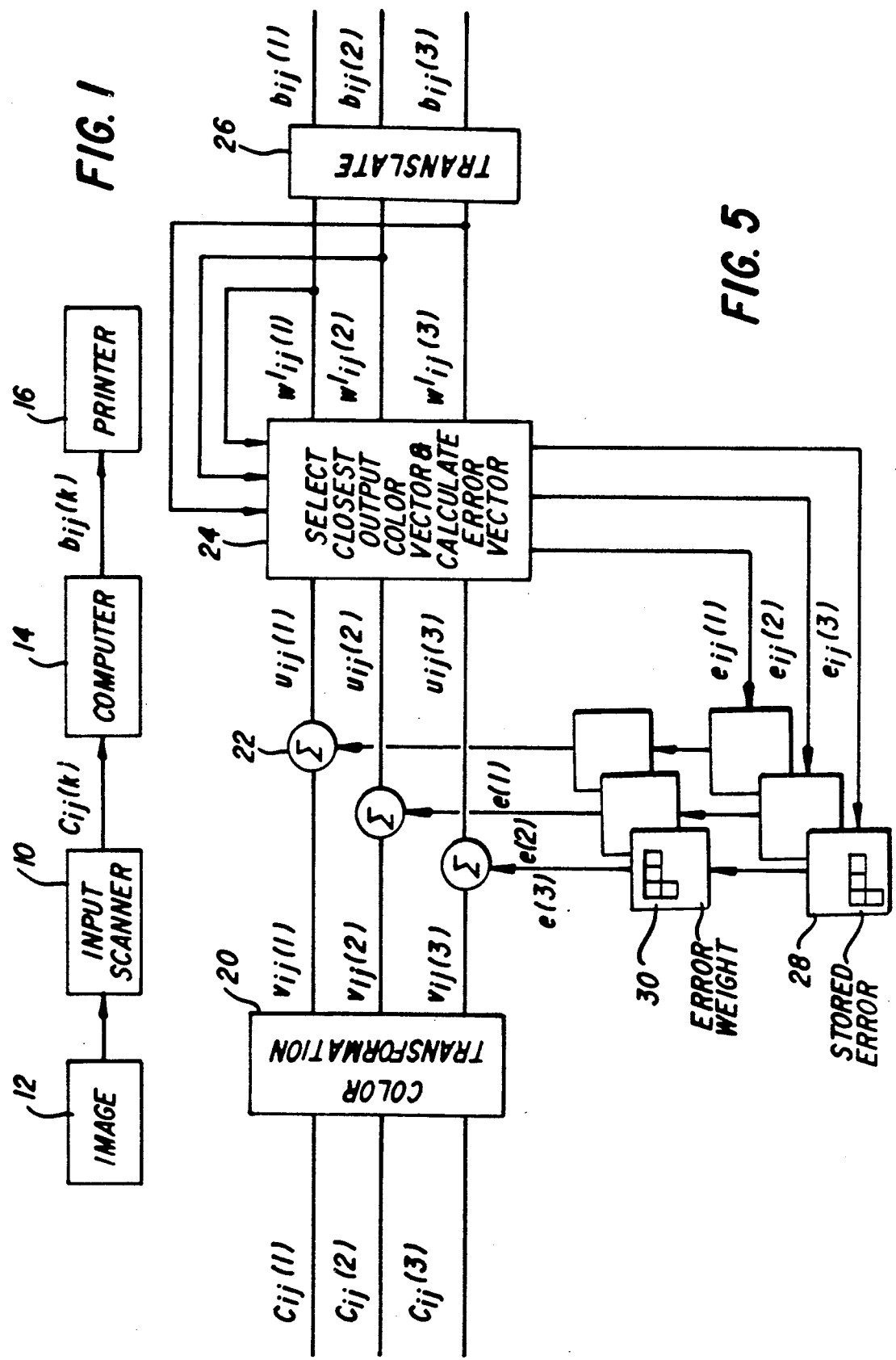
FIG. 1 is a block diagram of a system for carrying out the present invention.
Figure 2:
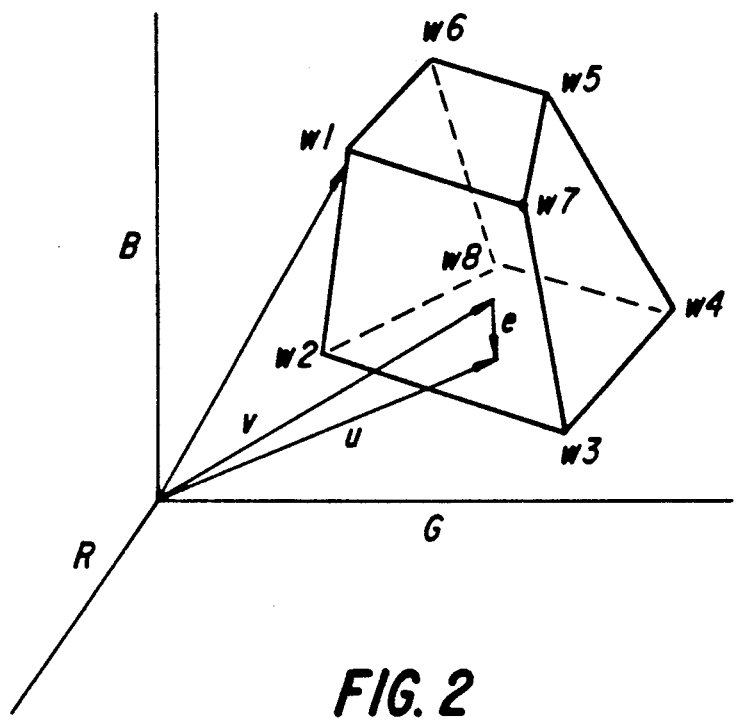
FIG. 2 is a plot that illustrates the color vector error diffusion technique of the present invention.
Figure 3:
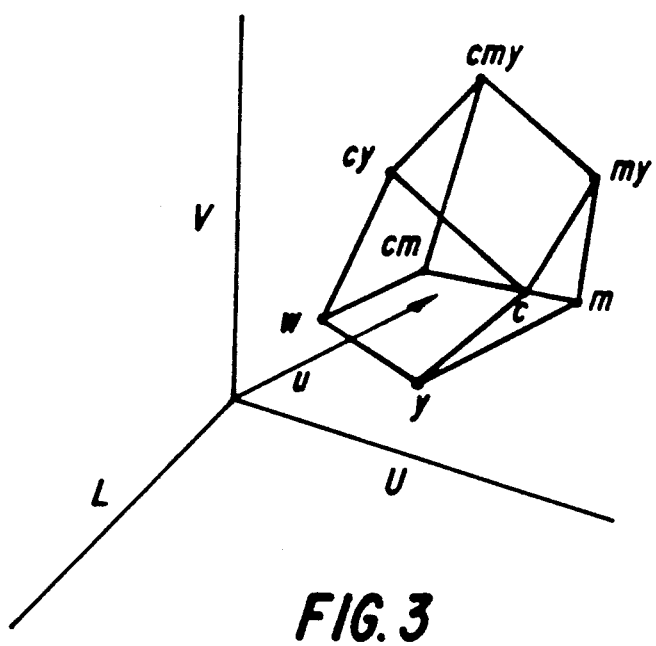
FIG. 3 is a plot that illustrates the color vector error diffusion technique of the present invention, perform in LUV color space.
Figure 4:
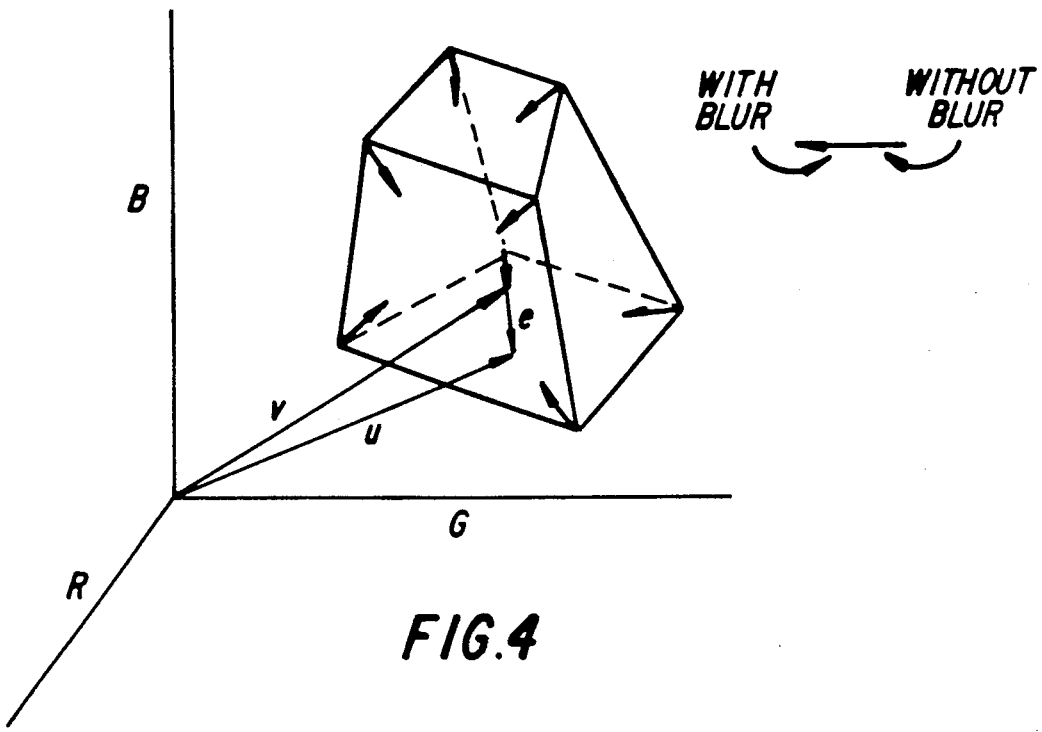
FIG. 4 is a plot that illustrates the color vector error diffusion technique of the present invention with the output colors modified by the color visual blur functions at each pixel.

A digital image processing system for implementing the halftoning method of the present invention is shown schematically in FIG. 1, and includes an input means 10 such as a scanner or solid state image sensor for sampling and digitizing a continuous-tone color image 12 such as a photograph or serial image. The three-color, continuous-tone digital image $c_{i,j}(k)$ is supplied to a computer 14 where it is processed according to the present invention to produce a three- or four-color binary digital image $b_{i,j}(k)$ for printout on a printer 16 such as an ink jet, dot matrix, thermal or laser electrophotographic printer, or a soft display device such as a CRT.

The input digital image $c_{i,j}(k)$ and all subsequent color signals can be represented by a series of three monochromatic pixels values i.e., k=1,2,3, or by a three-dimensional vector $\bar{c}_{i,j}$ arranged in an array of J pixels and I lines with the last pixel on the last line having indices (I,J).

Referring to FIG. 5, the method of the present invention will now be described. Input pixel values or color vectors $\bar{c}_{i,j}$ typically expressed as three 8-bit integers in the range from 0 to 255 are sequentially processed, one line at a time from left to right, and top to bottom of the image. The input color vectors are transformed 20 into the preferred color space, e.g.,RGB, XYZ, CIELUV, CIELAB, YIQ, or CMYK, to give new color vectors $\bar{v}_{i,j}$ that are vectorially added 22 to the weighted past errors $\bar{e}$ to produce error diffused color vectors $\bar{u}_{i,j}$. This can be expressed as $$\vec{u}_{i,j} = \vec{v}_{i,j} + \vec{e} \qquad (2)$$

or equivalently $$v_{i,j}(k) = v_{i,j}(k) + e(k), k=1,2,3. \qquad (3)$$

The error diffused color vector is compared 24 in a p-norm distance sense to the eight (or sixteen) output colors $\bar{w}_{i,j}^n, n=1,2,\ldots,8(16)$ representing the $2^3$ ($2^4$) binary color combinations in the preferred color space to select the closest output color $\bar{w}_{i,j}{}^n$. This is expressed as:

$$\vec{w}_{i,j}^l = \underset{\vec{w}_{i,j}^n}{\text{minimum}} [D_n], n = 1,2, \ldots, 8(16), \quad (4)$$

where $D_n$ is the $n^{th}$ p-norm distance given by $$D_n = |\vec{u}_{i,j} - \vec{w}_{i,j}^n|^p = \sum_{k=1}^{3} |u_{i,j}(k) - w_{i,j}^n(k)|^p, n = 1,2, \ldots 8(16) \quad (5)$$

where p is an integer representing the power to which the absolute value of the vector distance is raised, e.g. 1,2 or higher. The larger the value of p, the more that the largest component of the vector distance is emphasized.

The selected color is then translated 26 into the corresponding three- or four-channel binary printer signals $\vec{b}_{i,j}$ for output. The output color vector $\vec{w}_{i,j}^1$ is then subtracted from the error diffused color vector $\vec{u}_{i,j}$ to produce the error vector $\vec{e}_{i,j}$ given by $$\vec{e}_{i,j} = \vec{u}_{i,j} - \vec{w}_{i,j}. \quad (6)$$

Figure 6:
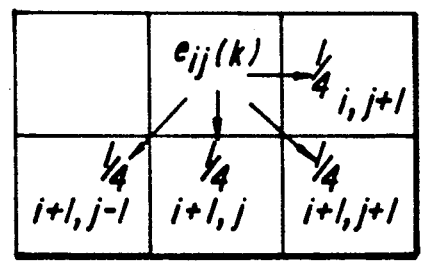
FIG. 6 is a diagram useful in describing the diffusion of error vectors in the error diffusion process.

This is stored 28 and weighted with past errors 30 to produce the weighted error vector $\bar{e}$ for the next pixel. FIG. 6 illustrates the manner in which the error will be diffused to neighboring pixels with a four pixel error matrix and reasonable choices for the weighting coefficients. The vector error component for color coordinate k at pixel (i,j), $e_{i,j}(k)$, will be weighted and distributed to pixels (i,j+1),(i+1,j+1),(i+1,j), (i+1,j-1).

In a further refinement, the present invention can be extended to include the color blur characteristics of the human visual system to produce color halftone output that has minimum diffused perceptual error. The estimates of the color visual blur functions will be described first, followed by a description of their use in the present invention.

There have been numerous studies on the characteristics of the human visual system. A comprehensive compilation of some of the major results is included in the text Design Handbook for Imagery Interpretation Equipment by J. M. Booth and R. J. Farrel, Boeing Aerospace Company, D180-19063-1, December 1975. The key feature of the vision system appropriate to the present invention is the two-dimensional visual blur function or its Fourier equivalent the modulation transfer function, MTF, which describes the visual response to suprathreshold signals. If the vision system is linear for small signal modulation, which has been demonstrated by many investigators to be accurate for modulations less than 20%, and shift-invariant or non-adaptive which has been shown to be the case for normal light levels, then the MTF can be modeled by the constant contrast sensitivity function or CSF or high-luminance, threshold-detection studies. The functional relationship used for this is:

$$MTF(f_v) = \begin{cases} a(b + cf_v)e^{-(cf_v)d}, & f_v \geq f\text{max} \\ 1.0, & \text{else,} \end{cases} \quad (7)$$

where the constants a,b,c,d can be calculated by regression fits of horizontal and vertical threshold modulation data for monochrome signals to be 2.2, 0.192, 0.114, and 1.1 respectively, $f_v$ is visual frequency in cycles/(visually subtended angle in degrees) in the horizontal or vertical direction, and the typical low frequency falloff of CSF data has been eliminated by setting the MTF to 1.0 for all frequencies below the peak $f_{max}$ of the functional fit. To use this function for other direction, the well known decrease in visual sensitivity at angles other than horizontal and vertical is modeled by a non-linear stretching of the spatial frequency axis $f_v$ as a function of angle. This is given by $f_v \rightarrow f_v/s(\theta)$ where $$s(\theta) = \frac{(1-w)}{2} \cos(4\theta) + \frac{(1+w)}{2}, \quad (8)$$

and the constant w is chosen from empirical data to be 0.7 which produces an effective bandwidth reduction at 45 degrees of 70%. To use this directional MTF in the image domain, it is necessary to convert from visual cycles/degree to cycles/mm on the document. This can be accomplished by the geometrical optics transformation $$f_v = (\pi/180) \frac{1}{\arcsin\left(\frac{1}{\sqrt{1+dis^2}}\right)} \sqrt{f_i^2 + f_j^2}, \quad (9)$$

where dis is the viewing distance in mm, $f_i$, $f_j$ are the discrete horizontal and vertical document frequencies in cyles/mm given by:

$$f_i = \frac{i-1}{\Delta N}, f_j = \frac{j-1}{\Delta m}, i = 1,2, \ldots,$$

$$N, j = 1,2, \ldots, M \, N \text{ and } M$$

are the number of horizontal and vertical blur samples, e.g., N=M=32, and $\Delta$ is the sample spacing on the document. By implementing these equations with a viewing distance of 254 mm and the aforementioned constants for aa,b,c,d,w the discrete monochrome visual MTF for a sample pitch of 16 samples/mm was generated and the inverse DFT was taken to get the discrete blur function. The unnormalized causal section, i.e., the section that includes only past processed pixels from left to right and top to bottom, is shown in Table I. As stated in the summary, it is well known that the visual blur function is wider for chrominence signals than for brightness signals and wider for blue-yellow, blue-black, or yellow-shite chrominance signals than for green-red, green-black, or red-black chrominance signals. To take advantage of this in the present invention the green-red and blue-yellow blur functions are calculated at equivalent viewing distances that are 2× and 4× greater than for brightness signals. This scales the values of Table I to agree approximately with empirically observed results. The use of these blur functions in the color halftoning technique of the present invention will be described now.

TABLE 1

| Casual Section of Human Visual Brightness Blur | | | | | | |
|---|---|---|---|---|---|---|
| −5.8 | −6.6 | 2.8 | 13.6 | 2.8 | −6.6 | −5.8 |
| −6.6 | −12.1 | 4.6 | 33.2 | 4.6 | −12.1 | −6.6 |
| −2.8 | 4.6 | 51.8 | 124.0 | 51.8 | 4.6 | 2.8 |
| 13.6 | 33.2 | 124.0 | 240.4 | | | |

Figure 7:
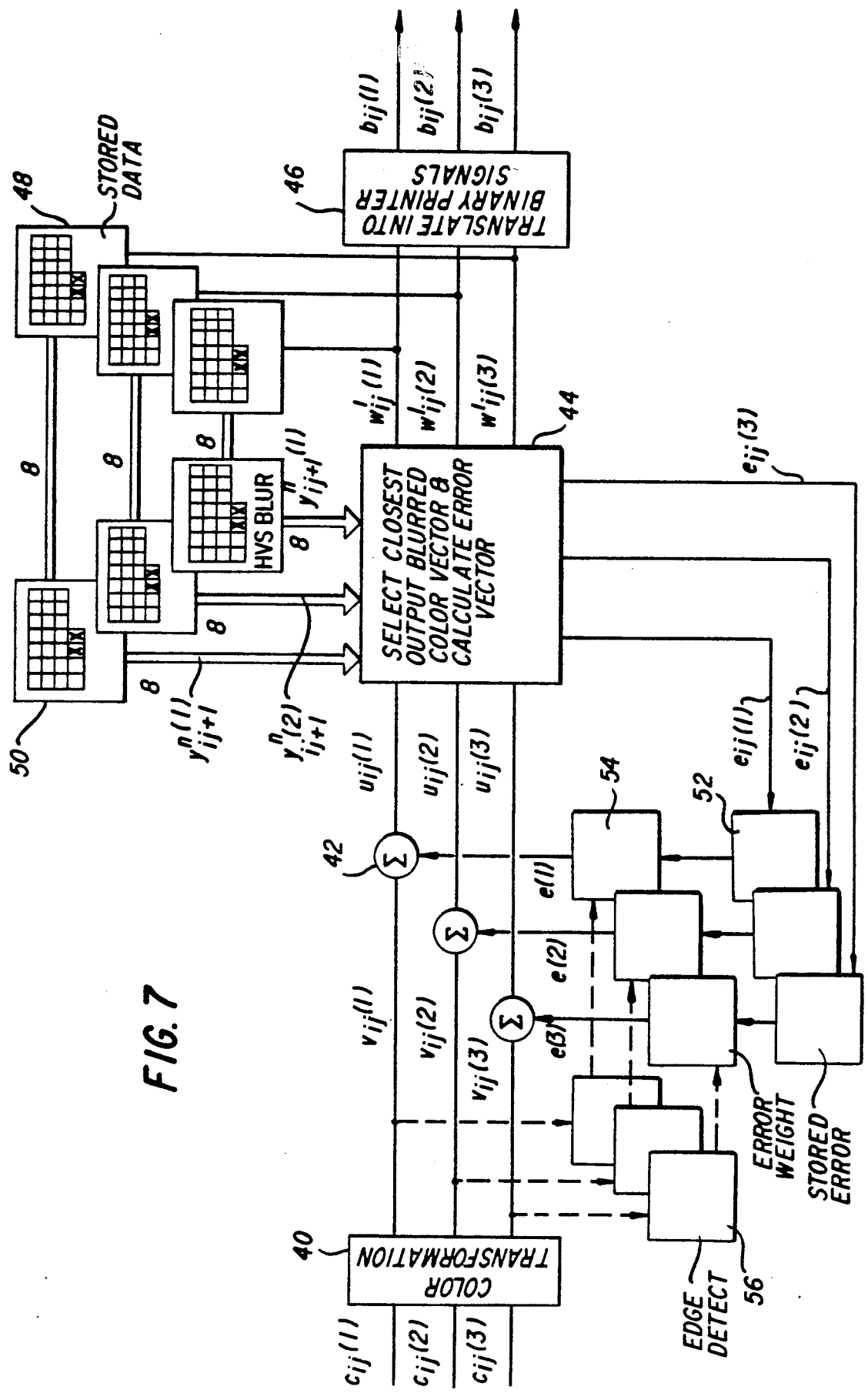
FIG. 7 is a schematic block diagram of the halftoning technique in an embodiment of the present invention with visual blur and edge detection.

Referring to FIG. 7, input pixel values or color vectors $\bar{c}_{i,j}$ typically expressed as three 8-bit integers in the range from 0 to 255 are sequentially processed, one line at a time from left to right, and top to bottom of the image. The input color vectors are transformed 40 into the preferred color space e.g., RGB, XYZ, CIELUV, CIELAB, YIQ, or CMYK, to give new color vectors $\bar{v}_{i,j}$ that are vectorially added 42 to the weighted past errors $\bar{e}$ to produce error diffused color vectors $\bar{u}_{i,j}$, as in equations (2) and (3). The error diffused color vector is compared 44 in a p-norm distance sense to the eight (or sixteen) blurred output color vector $\bar{y}_{i,j}{}^n, n=1,2,\ldots,8(16)$ in the preferred color space to select the closest output color vector $\bar{w}_{i,j}{}^l$. This is expressed as:

$$\bar{w}_{i,j}^l = \underset{\bar{y}_{i,j}^n}{\text{minimum}} [D_n], n = 1,2,\ldots,8(16), \quad (10)$$

where $D_n$ is the $n^{th}$ p-norm distance given by $$D_n = |\bar{u}_{i,j} - \bar{y}_{i,j}^n|^p = \sum_{k=1}^{3} |u_{i,j}(k) - y_{i,j}^n(k)|^p, n = 1,2,\ldots 8(16). \quad (11)$$

The selected color vector is then translated 46 into the corresponding three- or four-channel binary printer signals $\bar{b}_{i,j}$ for output. The output color vector coordinates $\bar{w}_{i,j}{}^l(k), k=1,2,3$, each of which can contain a maximum of 8 (16) unique values corresponding to the three color coordinates values of the 8 (16) possible output colors, are then stored 48 in pixel position (i,j) of each output color plane. The presently calculated portion of a 7×7 array of output pixels is shown graphically in the stored data block 48, with the most recently calculated output pixel being indicated with an "x". In the simplest case, where the halftoning is done in the CMY printer color space, the eight possible output color vector form a cube of points, i.e., {000,001,010,011,100,101,110,111}, and the stored values are binary. The next pixel position (i,j+1) of each color plane is independently loaded with the color coordinates of the possible output color vector and independently weighted 50 by the appropriate color blur matrix to produce blurred color coordinates $y_{i,j+1}{}^n(k), k=1,2,3, n=1,2,\ldots,8(16)$ for the next pixel. In FIG. 7, this eight (or sixteen) channel link is represented by ∥ 8. This blur calculation can be expressed as $$y_{i,j+1}^n(k) = h_{0,0}(k)w_{i,j+1}^n(k) + \quad (12)$$

$$\sum_{s=1}^{N(k)} \sum_{t=1}^{M(k)} h_{s,t}(k) w_{i-s,j+1-t}^l(k); k = 1,2,3, n, l = 1,2,\ldots,8(16),$$

where n(k) and M(k) define the extend of the blur functions for each color coordinate k. These can also be represented as blurred color vectors $\bar{y}_{i,j+1}{}^n$. The selected blurred color vector for pixel $(i,j)\bar{y}_{i,j}{}^l$ is subtracted 44 from the error diffused color vector $\bar{u}_{i,j}$ to produce the error vector $\bar{e}_{i,j}$ given by $$\bar{e}_{i,j} = \bar{u}_{i,j} - \bar{v}_{i,j} \quad (13)$$

This is then stored 52 and weighted with past errors 54 to produce the weighted error vector $\bar{e}$ for the next pixel.

Figure 8:
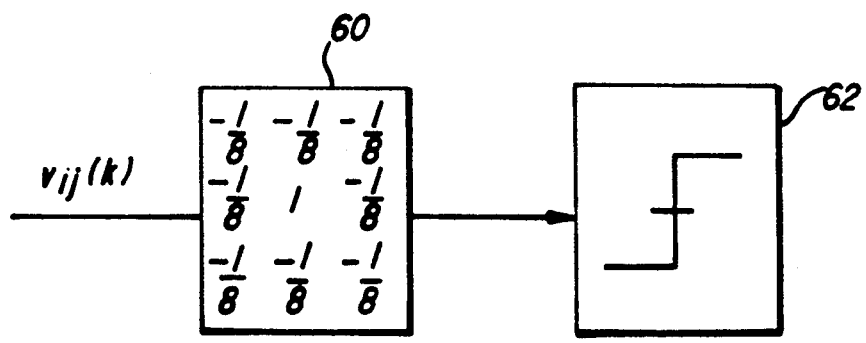
FIG. 8 is a schematic block diagram illustrating the steps of edge detection in an embodiment of the present invention.

In a further refinement, the transformed color vector components $v_{i,j}(k)$ are filtered 56 to detect edge pixels and the error propagation is truncated by setting the error weights to zero at each detected color edge. This prevents diffusion of error across edge boundaries in each color plane which improves the edge sharpness of the output image. As shown in FIG. 8, the edge detection can be accomplished, for example, with a 3×3 digital filter 60 having coefficient weights as shown, followed by a threshold detection step 62. A detection step of 5-10 counts out of 256 works satisfactorily. The halftoning apparatus of the present invention comprises a programmed general purpose computer such as a microprocessor or alternately a custom designed digital signal processing circuit. The output image can be printed on a binary color recording device, such as a hardcopy laser recorder or digital copier. The present invention is readily extended to non-binary printers that have more than two levels for each output color by including the multilevel vectors in the selection process for the closest blurred output color vector at each pixel. For an eight level system this would mean $8^3=512$ comparisons at each pixel.

INDUSTRIAL APPLICABILITY AND ADVANTAGES

The halftoning technique of the present invention is useful in systems that generate color binary outputs from continuous tone color input images or computer generated graphics. The invention has the advantage that it is optimal in terms of perceived noise in constant signal regions and does not have the periodic patterns of dithering or the correlated noise of error diffusion. It provides the first method for producing color-dependent halftone output for systems that screen in the color space of the output device. It also has implementation advantages over standard error diffusion because the correlated noise or "worms" can be eliminated without expanding the size of the error matrix, i.e., a four pixel matrix is acceptable, or adding a dithered threshold or random noise.

We claim:
1. A method of producing a halftone digital color image having pixels representing values in an output color space from a continuous tone color digital image having pixels representing continuous values in an input color space, comprising the steps of:
   a. transforming a pixel in the input color space to a vector in a preferred color space;
   b. representing all possible values in the output color space as output vectors in the preferred color space;
   c. selecting and output vector in the preferred color space that is closest to the transformed input pixel;
   d. calculating an error vector in the preferred color space as the distance between the transformed input pixel and the selected output vector;
   e. distributing by weighted addition the calculated error vector to a neighborhood of adjacent input pixels to be processed; and
   f. translating the selected output vector to a pixel in the output color space.
2. The method claimed in claim 1, wherein the preferred color space is a uniform visual color space.
3. The method claimed in claim 2, wherein the preferred color space is CIELUV.
4. The method claimed in claim 1, further comprising:
   employing a neighborhood of previously selected output vectors weighted by a human visual system blur filter to produce a blurred output vector and using the blurred output vector as the output vector employed in the error determining step.

5. The method claimed in claim 4, wherein the neighborhood is a previously calculated portion of an array of pixels, and said human visual system filter is a digital filter having the weights:

| −5.8 | −6.6 | 2.8 | 13.6 | 2.8 | −6.5 | −5.8 |
|---|---|---|---|---|---|---|
| −6.6 | −12.1 | 4.6 | 33.2 | 4.6 | −12.1 | −6.6 |
| 2.8 | 4.6 | 51.8 | 124.0 | 51.8 | 4.6 | 2.8 |
| 13.6 | 33.2 | 124.0 | 240.4 | | | |

* * * * *